United States Patent
Courtier (10) Patent No.: US 11,155,336 B2
(45) Date of Patent: Oct. 26, 2021

(54) COMPOSITE AIRCRAFT PROPELLER BLADE WITH AN INTEGRATED SPAR

(71) Applicant: SAFRAN AIRCRAFT ENGINES, Paris (FR)

(72) Inventor: Vivien Mickaël Courtier, Yerres (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 105 days.

(21) Appl. No.: 16/245,875

(22) Filed: Jan. 11, 2019

(65) Prior Publication Data

US 2019/0217943 A1    Jul. 18, 2019

(30) Foreign Application Priority Data

Jan. 12, 2018  (FR) ...................................... 1850259

(51) Int. Cl.
*B64C 11/26*    (2006.01)
*B29C 70/24*    (2006.01)
(Continued)

(52) U.S. Cl.
CPC .............. *B64C 11/26* (2013.01); *B29B 11/16* (2013.01); *B29C 70/24* (2013.01); *B29C 70/48* (2013.01);
(Continued)

(58) Field of Classification Search
CPC ......... B64C 11/26; B64C 11/16; B64C 11/18; B29C 70/86; B29C 70/682
See application file for complete search history.

(56) References Cited

U.S. PATENT DOCUMENTS 7,547,193 B2 *  6/2009  Moffitt ...................... B64C 3/14
                                                                 416/228
8,685,868 B2 *  4/2014  Bouillon .............. D03D 25/005
                                                                 442/205
(Continued)

FOREIGN PATENT DOCUMENTS

WO    WO 2006/136755 A2    12/2006
WO    WO 2012/001279 A1     1/2012
WO    WO 2015/004362 A1     1/2015

OTHER PUBLICATIONS

Search Report as issued in French Patent Application No. 1850259, dated Sep. 6, 2018.

*Primary Examiner* — Michael L Sehn
(74) *Attorney, Agent, or Firm* — Pillsbury Winthrop Shaw Pittman LLP (57) ABSTRACT

A reinforcing fiber structure for a propeller blade made of composite material is woven as a single piece to have an airfoil, a spar portion, and an enlarged portion. The fiber structure includes a zone of non-interlinking extending between the front and rear edges of the airfoil, and extending between an intermediate zone and the bottom edge of said airfoil. The spar portion extends inside the airfoil in the zone of non-interlinking, the spar portion extending outside the airfoil through the bottom edge of said airfoil. The enlarged portion extends from the spar portion outside the airfoil. The airfoil includes skins that are not interlinked with each other in the zone of non-interlinking and that surround the spar portion. The skins define two housings present inside the airfoil on respective sides of the spar portion and opening out through the bottom edge of the airfoil.

12 Claims, 10 Drawing Sheets

(51) Int. Cl.
    *B29B 11/16*    (2006.01)
    *B29C 70/86*    (2006.01)
    *B29C 70/48*    (2006.01)
    *B29C 70/54*    (2006.01)
    *F04D 29/32*    (2006.01)
    *B29D 99/00*    (2010.01)
    *F01D 5/28*     (2006.01)
    *D03D 25/00*    (2006.01)
    *F04D 29/02*    (2006.01)
    *B29C 70/68*    (2006.01)
    *B64C 11/18*    (2006.01)
    *B29L 31/08*    (2006.01)

(52) U.S. Cl.
    CPC .......... *B29C 70/545* (2013.01); *B29C 70/682* (2013.01); *B29C 70/86* (2013.01); *B29D 99/0025* (2013.01); *B64C 11/18* (2013.01); *D03D 25/005* (2013.01); *F01D 5/282* (2013.01); *F04D 29/023* (2013.01); *F04D 29/322* (2013.01); *F04D 29/324* (2013.01); *B29C 2793/009* (2013.01); *B29L 2031/08* (2013.01); *B29L 2031/087* (2013.01); *F05D 2300/603* (2013.01)

(56) References Cited

U.S. PATENT DOCUMENTS

| | | | |
|---|---|---|---|
| 2011/0248416 A1* | 10/2011 | Mahieu | B29B 11/16 264/40.1 |
| 2013/0017093 A1 | 1/2013 | Coupe | |
| 2014/0369848 A1* | 12/2014 | Marchal | B29C 70/24 416/230 |
| 2016/0159460 A1* | 6/2016 | Laurenceau | B29C 70/48 416/226 |
| 2016/0244897 A1* | 8/2016 | Gimat | B29C 70/228 |

* cited by examiner

COMPOSITE AIRCRAFT PROPELLER BLADE WITH AN INTEGRATED SPAR

CROSS-REFERENCE TO RELATED APPLICATIONS

This application claims priority to French Patent Application No. 1850259, filed Jan. 12, 2018, the entire content of which is incorporated herein by reference in its entirety.

FIELD

The present invention relates to the field of propeller blades for aircraft of the kind present on turboprops.

BACKGROUND

Propeller blades for turboprops are generally made of metal material. Although propeller blades made of metal material present good mechanical strength, they nevertheless present the drawback of being relatively heavy.

In order to obtain propeller blades that are lighter, it is known to make propeller blades out of composite material, i.e. by making structural parts out of fiber reinforcement with a resin matrix.

Documents US 2013/0017093 and WO 2012/001279 describe making a propeller blade from a fiber structure having an aerodynamic profile and into which there is inserted a portion of a spar, one end of the spar being extended by an enlarged portion that is to form the root of the propeller blade. The fiber structure, which is made as a single piece by three-dimensional weaving, includes a zone of non-interlinking that enables a housing to be formed inside the fiber structure and into which a portion of the spar is inserted.

The propeller blade as obtained in this way presents both overall weight that is lighter and also considerable mechanical strength as a result of the presence of a skin made of a composite material structure (fiber reinforcement densified by a matrix).

Nevertheless, in certain circumstances, it can be difficult to keep the inserted spar properly in place in the fiber structure, such as for example when the blade is subjected to high mechanical loading, to impacts, or to shocks.

SUMMARY

It is therefore desirable to be able to have a solution for making aircraft propeller blades of the above-described type, but that present increased mechanical strength, in particular in terms of keeping the spar in position inside the fiber structure of aerodynamic profile.

To this end, an aspect of the invention provides a fiber reinforcing structure for a propeller blade made of composite material, the fiber structure being woven as a single piece and having an airfoil, a spar portion, and an enlarged portion, the airfoil extending in a longitudinal direction between a bottom end and a top end, and extending in a transverse direction between a front edge and a rear end, the fiber structure including a zone of non-interlinking between the front and rear edges of the airfoil in the transverse direction, and extending between an intermediate zone and the bottom edge of said airfoil in the longitudinal direction, the spar portion extending inside the airfoil in the zone of non-interlinking, being set back from the front and rear edges of said airfoil in the transverse direction, the spar portion leading to the outside of the airfoil in the bottom edge of said airfoil, the enlarged portion extending from the spar portion outside the airfoil, the enlarged portion extending in the transverse direction over a length that is shorter than the length of the bottom edge of the airfoil, the airfoil having first and second skins in the zone of non-interlinking that are not interlinked with each other, the first and second skins extending between the front and rear edges of the airfoil in the transverse direction, and extending between the intermediate zone and the bottom edge of said airfoil in the longitudinal direction, the skins surrounding the spar portion, the first and second skins defining first and second housings inside the airfoil, which housings are present on respective sides of the spar portion in the transverse direction, the first and second housings opening out through the bottom edge of the airfoil.

By making a spar portion that is thus integrally formed with the airfoil of the fiber structure that is to form the fiber reinforcement of a propeller blade made of composite material, it is ensured that the attachment portions (tang and root) of the propeller blade are held properly in position relative to the airfoil. Specifically, even in the event of mechanical stresses (impacts, shocks) on the airfoil of the propeller blade, there is no risk of the spar portion moving inside the reinforcement since it is connected to the airfoil by continuously woven portions of the reinforcement.

In an aspect of the fiber structure of the invention, the front edge and the rear edge present respective slots extending in the longitudinal direction between the intermediate portion and the bottom end of the fiber structure. This serves in particular to give access to the spar portion blank in order to cut off the floated yarns after weaving the fiber structure blank, and also to make it easier subsequently to put the shaper parts into place.

An aspect of the invention also provides a propeller blade comprising fiber reinforcement constituted by a fiber structure of the invention and densified by a matrix, the propeller blade comprising an airfoil, a spar portion extending inside the airfoil, a tang extending outside the airfoil, a root extending outside the airfoil from the tang, a first shaper part present in the first housing provided inside the airfoil, and a second shaper part present in the second housing provided inside the airfoil.

As mentioned above, the propeller blade of an embodiment of the invention presents very good mechanical strength, in particular at the connection between the root and the airfoil, as a result of the fiber reinforcement having the root, the tang, and the spar portion being made integrally with the airfoil.

In a first aspect of the propeller blade of the invention, the tang connecting the root to the spar portion presents side edges that are straight and parallel to the longitudinal direction. This forms a short broached root without introducing connection radii between the root and the airfoil, thereby greatly improving the mechanical strength of this portion of the blade. Specifically, the connection zone between the root and the airfoil is a zone of the propeller blade that is highly stressed mechanically since it concentrates the mechanical stresses generated by the shape of the moving propeller blade, and it corresponds to a zone that can be the seat of critical vibration that might lead to decohesion between the fibers and the matrix. In the absence of a connection radius, the mechanical strength of the propeller blade is thus improved, while conserving a root that is very compact.

In a second aspect of the propeller blade of the invention, the height of the zone of non-interlinking present in the fiber structure constituting the fiber reinforcement of the propeller blade lies in the range 10% to 50%, in an embodiment in the range 20% to 40%, of the total height of the airfoil in the longitudinal direction.

An aspect of the invention also provides an aeroengine including a plurality of propeller blades of the invention.

An aspect of the invention also provides an aircraft including at least one aeroengine of the invention.

Another aspect of the present invention also provides a method of fabricating a reinforcing fiber structure for a propeller blade out of composite material, the method comprising:

three-dimensionally weaving a fiber structure blank as a single piece between a plurality of layers of weft yarns and a plurality of layers of warp yarns, the blank extending in a longitudinal direction between a bottom portion and a top portion, and extending in a transverse direction between a front edge and a rear edge, the blank comprising an airfoil blank, a spar portion blank, and an enlarged portion blank, the method comprising, during weaving of the fiber structure blank, forming non-interlinking inside the airfoil blank, the non-interlinking extending between an intermediate zone and the bottom edge of the fiber structure blank in the longitudinal direction, and extending between the front and rear edges of the fiber structure blank in the transverse direction, the non-interlinking separating first and second portions present on either side of the spar portion blank so as to form first and second skin portion blanks that are not interlinked with each other, the first and second skin blanks extending between the front and rear edges of the fiber structure blank in the transverse direction, and extending between the intermediate zone and the bottom edge of the fiber structure blank in the longitudinal direction, the skin blanks surrounding the spar portion blank, the first and second skin blanks defining first and second housings inside the fiber structure blank, the housings being present on respective sides of the spar portion blank in the transverse direction, the first and second housings opening out through the bottom portion of the fiber structure blank;

cutting off floated yarns present at the outside of the fiber structure blank so as to define the outline of the fiber structure; and cutting off floated yarns present around the spar portion blank and around the enlarged portion blank and also floated yarns present at the bottom portion of the fiber structure blank so as to obtain a fiber structure comprising an airfoil having a bottom edge from which an enlarged portion extends from a spar portion outside the airfoil, the enlarged portion extending in the transverse direction over a length shorter than the length of the bottom edge of the airfoil.

Finally, an aspect of the invention provides a method of fabricating a propeller blade out of composite material, the method comprising at least:

making a fiber structure of the invention;

shaping the fiber structure by inserting first and second shaper parts respectively into the first and second housings present inside the airfoil of the fiber structure in order to obtain a propeller blade preform;

densifying the preform with a matrix; and machining away excess lengths present on the densified preform in order to obtain a propeller blade having an airfoil, a spar portion extending inside the airfoil, a tang extending outside the airfoil, a root extending outside the airfoil from the tang, a first shaper part present in the first housing formed inside the airfoil, and a second shaper part present in the second housing formed inside the airfoil.

In a first aspect of the method of the invention for fabricating a propeller blade, the tang connecting the root to the spar portion presents side edges that are straight and parallel to the longitudinal direction.

In a second aspect of the method of the invention for fabricating a propeller blade, the height of the zone of non-interlinking present in the fiber structure constituting the fiber reinforcement of the propeller blade lies in the range 10% to 50%, and in an embodiment in the range 20% to 40%, of the total height of the airfoil in the longitudinal direction.

BRIEF DESCRIPTION OF THE DRAWINGS

Other characteristics and benefits of the invention appear from the following description of particular embodiments of the invention given as non-limiting examples and with reference to the accompanying drawings, in which.

DETAILED DESCRIPTION

The invention applies in general manner to various types of propeller blade used in aeroengines. The invention has a beneficial but non-exclusive application to propeller blades of large dimensions that, because of their size, present considerable weight that has a significant impact on the overall weight of the aeroengine. The blade of an aspect of the invention may in particular constitute a blade for ducted rotor wheels such as fan blades, or a blade for unducted rotor wheels such as in so-called "open rotor" aeroengines.

Figure 1:
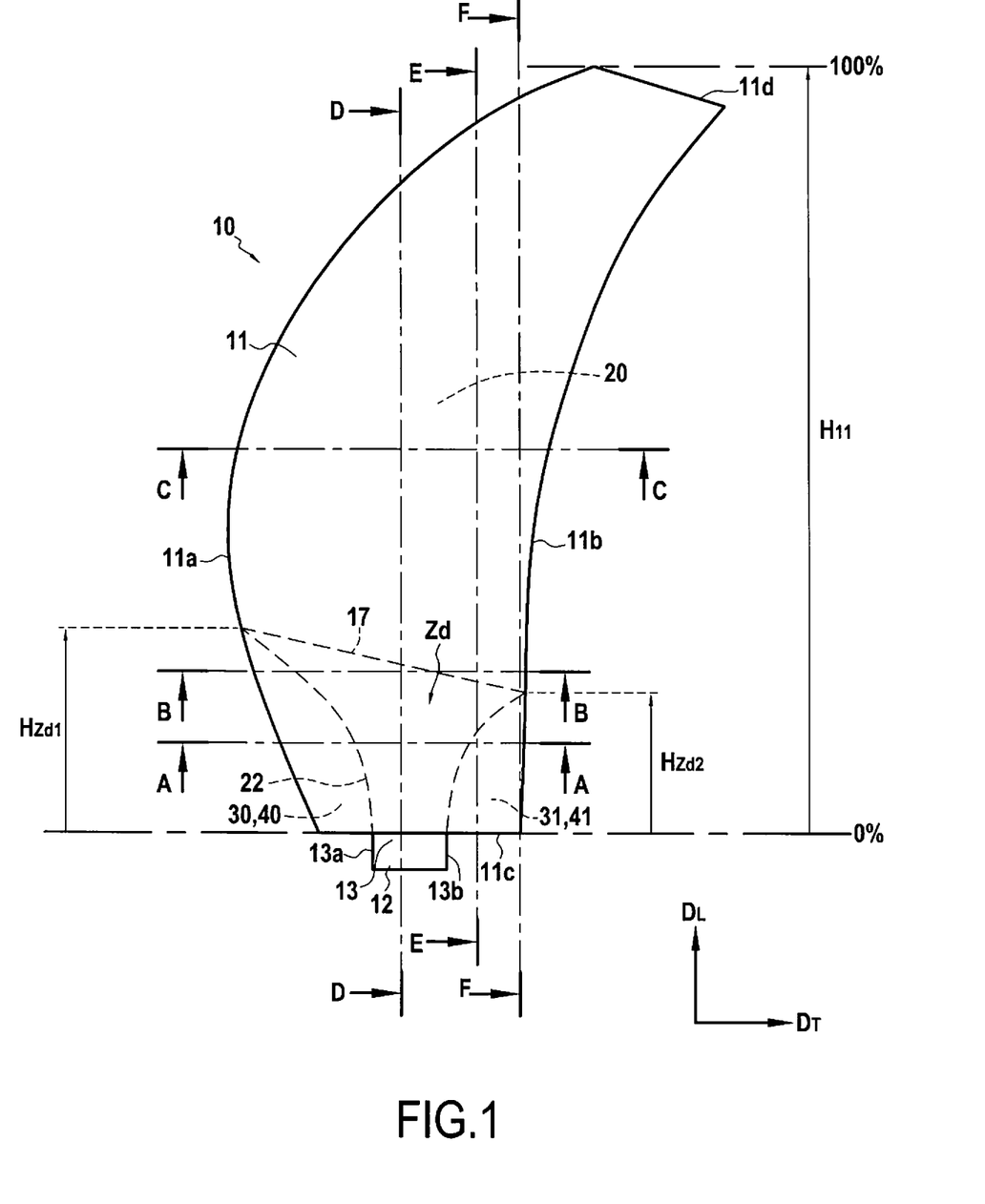
FIG. 1 is a diagrammatic view of a blade in accordance with an embodiment of the invention.
Figure 2A:
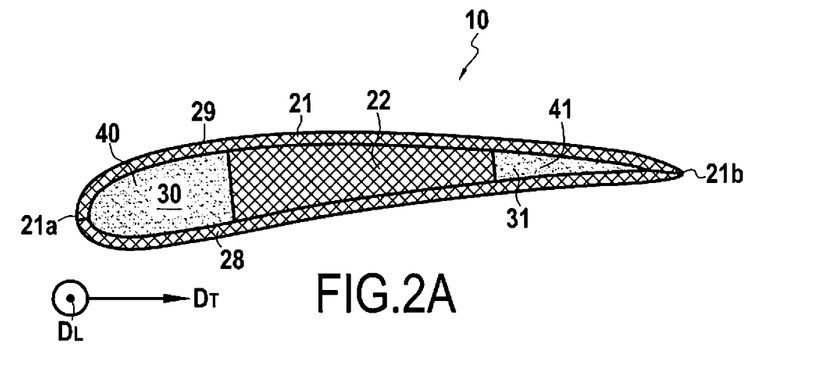
FIGS. 2A to 2C are cross-section views of the FIG. 1 blade on respective section planes A, B, and C shown in FIG. 1.
Figure 2B:
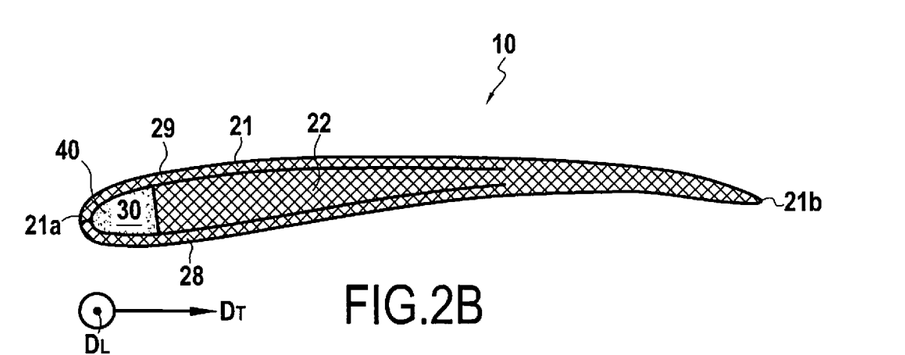
Figure 2C:
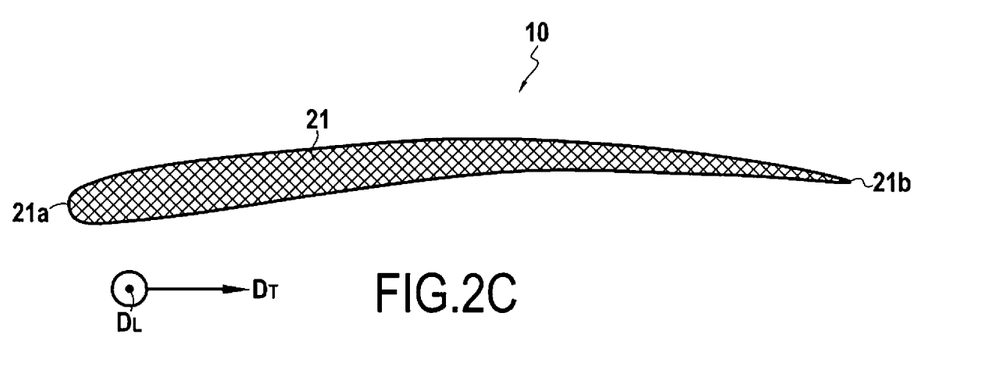
Figure 2D:
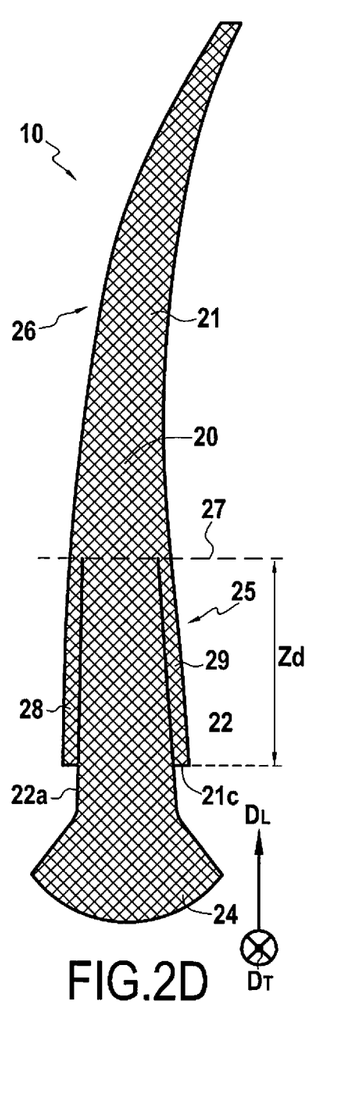
FIGS. 2D to 2F are longitudinal section views of the FIG. 1 blade on respective section planes D, E, and F shown in FIG. 1.
Figure 2E:
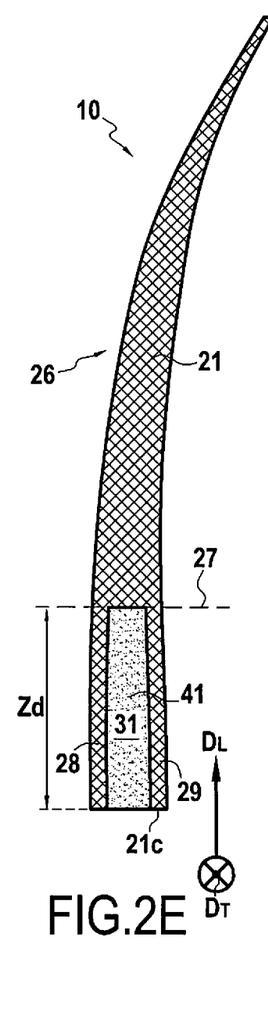
Figure 2F:
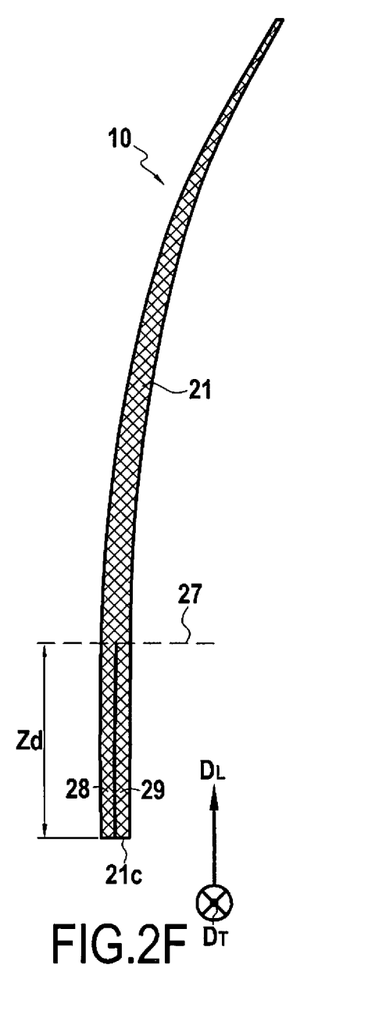

FIG. 1 shows a blade 10 for mounting on an airplane turboprop, which blade comprises an airfoil 11 that is to form the aerodynamic portion of the blade, a root 12 formed by a portion of greater thickness, e.g. having a bulb-shaped section, and extended by a tang 13. In cross-section, the airfoil structure 11 presents a curved profile of thickness that varies between its leading edge 11a and its trailing edge 11b in a transverse direction $D_T$. The airfoil 11 extends in a longitudinal direction $D_L$ between a bottom edge 11c and a top edge 11d. The root 12 extends in the transverse direction $D_T$ over a length that is less than the length of the bottom edge 11c of the airfoil 11.

As shown in FIGS. 1 and 2A to 2F, the blade 10 comprises fiber reinforcement 20 densified by a matrix, the fiber reinforcement 20 being constituted by a fiber structure of an embodiment of the invention, for which the structure and the method of fabrication are described below. As shown in FIGS. 2A to 2F, the fiber reinforcement 20 comprises a structure 21 of aerodynamic profile made as a single piece that is to form the airfoil of the blade 10, a spar portion 22 extending inside the structure 21 of aerodynamic profile, an enlarged portion 24 forming the blade root 12 extending from the spar portion 22 outside the structure 21 of aerodynamic profile, and the part 22a of the spar portion that is present outside the structure 21 of aerodynamic profile and that connects with the enlarged portion 24 itself forming the tang 13 of the blade 10. The fiber reinforcement 20 mainly comprises first and second portions 25 and 26 that are separated from each other by an intermediate zone 27. The first portion 25 defines a zone $Z_D$ of non-interlinking inside the structure 21 of aerodynamic profile, the zone of non-interlinking extending between the intermediate zone 27 and the bottom edge 21c of the structure 21 of aerodynamic profile corresponding to the bottom edge 11c of the airfoil 11 in the longitudinal direction $D_L$, and extending between the front and rear edges 21a and 21b of the structure 21 of aerodynamic profile corresponding respectively to the leading edge 11a and to the trailing edge 11b of the airfoil 11 in the transverse direction $D_T$. The first portion 25 has first and second skins 28 and 29 that are not interlinked with each other and that are not interlinked with the spar portion 22, the first and second skins 28 and 29 extending between the front and rear edges 21a and 21b of the structure 21 of aerodynamic profile in the transverse direction, and extending between the intermediate zone 27 and the bottom edge 21c of the structure 21 of aerodynamic profile in the longitudinal direction, the skins 28 and 29 surrounding the spar portion 22. Inside the structure 21 of aerodynamic profile, the first and second skins 28 and 29 define first and second housings 30 and 31 that are present respectively on either side of the spar portion 22 in the transverse direction, the first and second housings 30 and 31 opening out into the bottom edge 21c of the structure 21 of aerodynamic profile. A first shaper part 40 is present in the first housing 30. Likewise, a second shaper part 41 is present in the second housing 31.

In order to shape the fiber reinforcement 20, but without significantly increasing the overall weight of the structure of aerodynamic profile of the propeller blade, the parts 40 and 41 are, in an embodiment, made of rigid material that is cellular, i.e. material presenting low density, e.g. such as a rigid foam. The shaper parts may be made by molding or by being machined from a block of material.

The method of fabricating a blade of an embodiment of the invention includes making a fiber structure in accordance with the present invention.

Figure 3:
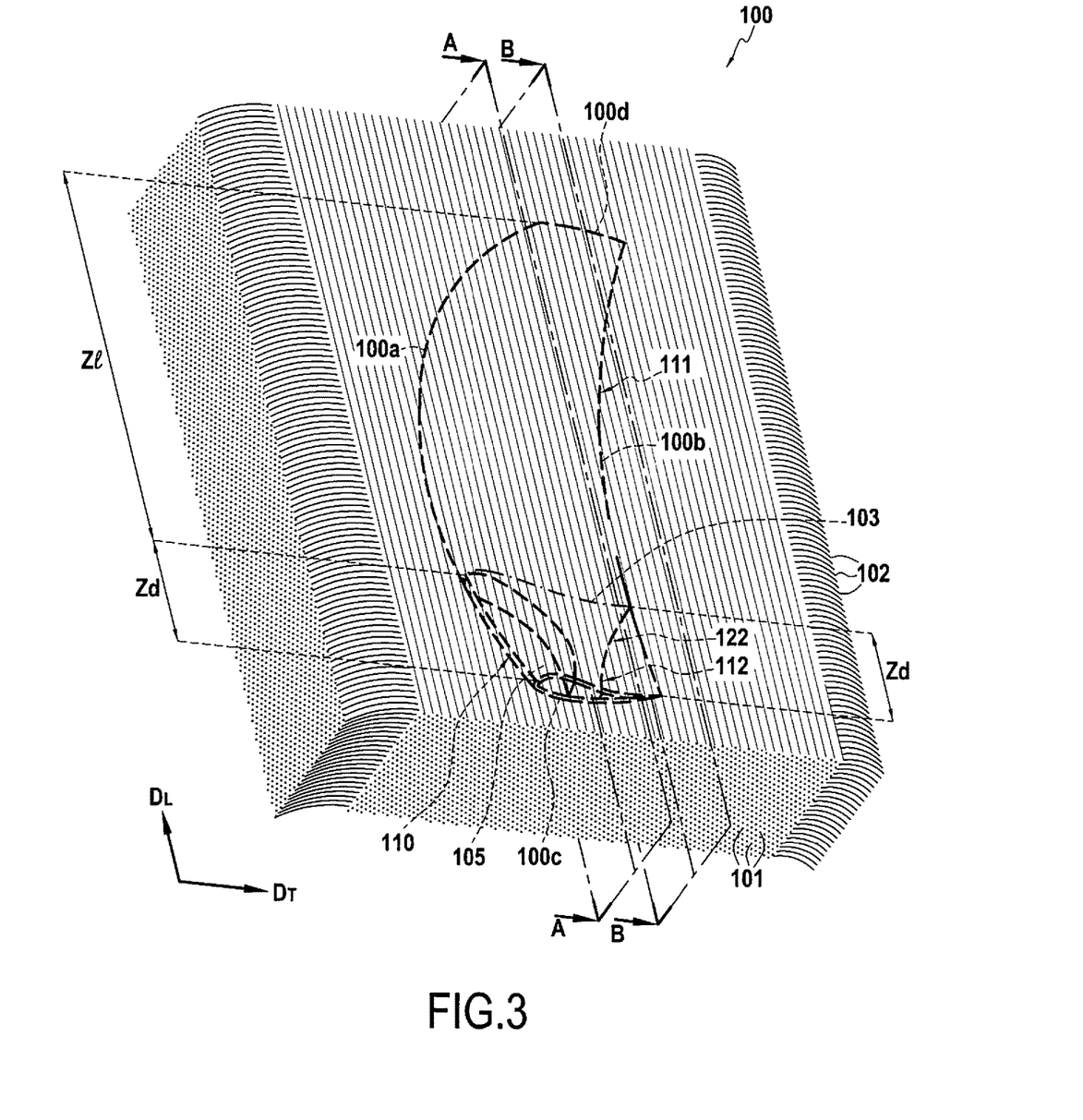
FIG. 3 is a diagrammatic view showing the 3D weaving of a fiber structure blank for fabricating the FIG. 1 blade.

FIG. 3 shows very diagrammatically a fiber structure blank 100 that is to form the fiber preform of the blade that is to be made.

As shown diagrammatically in FIG. 3, the fiber structure blank 100 is obtained by three-dimensional (3D) weaving performed in known manner on a Jacquard type loom having arranged thereon a bundle of warp yarns 101 or strands in a plurality of layers, each comprising several hundred yarns, the warp yarns being interlinked by weft yarns 102. The fiber structure blank 100 is woven as a single piece, the blank extending in a longitudinal direction between a bottom portion 100c and a top portion 100d, and extending in a transverse direction between a front edge 100a and a rear edge 100b, the blank comprising an airfoil blank 111, a spar portion blank 122, and an enlarged portion blank 112, the spar portion blank 122 extending inside the fiber structure blank 100 while being set back from the front and rear edges 100a and 100b in the transverse direction $D_T$, and extending in the longitudinal direction $D_L$ between an intermediate zone 103 situated between the bottom and top portions 100c and 100d of the fiber structure blank, the enlarged portion blank 112 extending from the spar portion blank 122.

In the example shown, the 3D weaving is performed with an "interlock" weave. The term "interlock" weave is used herein to mean a weave in which each layer of weft yarns interlinks a plurality of layers of warp yarns with all of the yarns in the same weft column having the same movement in the weave plane.

It is possible to use other known types of three-dimensional weaving, in particular such as those described in Document WO 2006/136755, the content of which is incorporated herein by way of reference. That document describes in particular making fiber reinforcement structures by weaving a single piece for use in parts such as blades having a first type of weave in a core and a second type of weave in a skin so as to give a part of that type both the expected mechanical properties and also the expected aerodynamic properties.

The fiber blank of an embodiment of the invention may be woven in particular out of yarns comprising fibers made of carbon or of ceramics, such as silicon carbide.

The fiber blank is of varying thickness and width, and as weaving of the blank progresses, varying numbers of warp yarns are not included in the weaving, thereby making it possible to define the desired continuously varying outline and thickness for the blank 100. An example of varying 3D weaving serving in particular to vary the thickness of the blank between a first edge that is to form the leading edge and a second edge of smaller thickness that is to form the trailing edge is described in Document EP 1 526 285, the content of which is incorporated herein by way of reference.

Figure 4A:
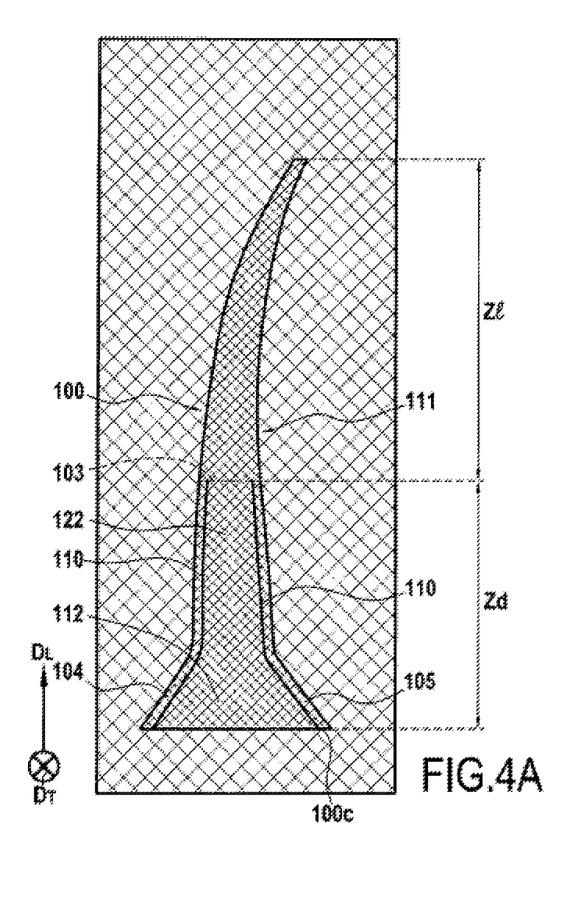
FIGS. 4A and 4B are longitudinal section views of the FIG. 3 blank on respective section planes A and B shown in FIG. 3.
Figure 4B:
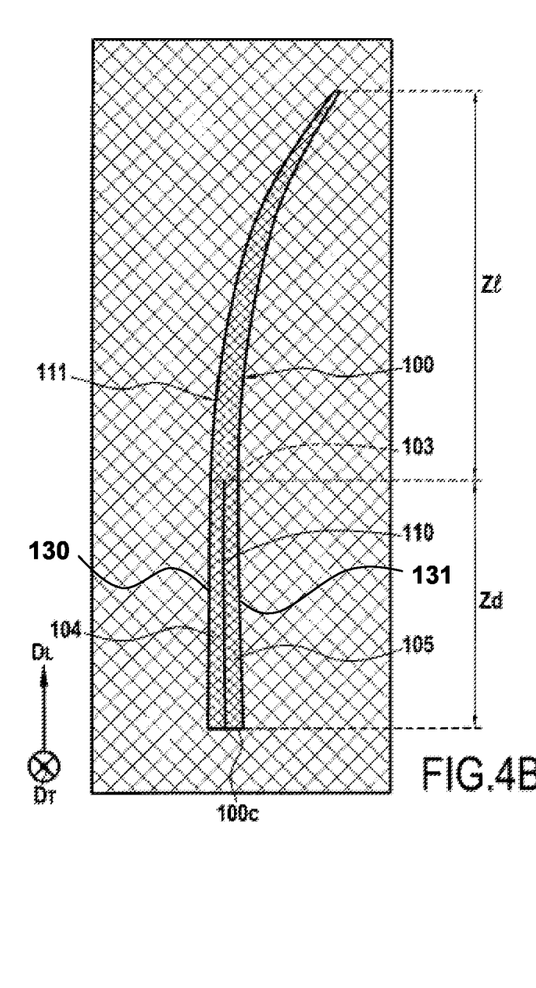

Furthermore, while weaving the fiber blank, non-interlinking 110 is performed inside the fiber blank between successive layers of warp yarns and over a zone $Z_d$ of non-interlinking, thereby distinguishing said zone $Z_d$ of non-interlinking from a zone $Z_1$ of interlinking within the fiber blank. More precisely, and as shown in FIGS. 4A and 4B, the non-interlinking 110 extends between an intermediate zone 103 and the bottom edge 100c of the fiber structure blank 100 in the longitudinal direction $D_L$, and extends between the front and rear edges 100a and 100b of the fiber structure blank 100 in the transverse direction $D_T$, the non-interlinking 110 separating the first and second portions present on either side of the spar portion blank 122 so as to form first and second skin blanks 104 and 105 that are not interlinked relative to each other. The first and second skin blanks 104 and 105 extend between the front and rear edges 100a and 100b of the fiber structure blank 100 in the transverse direction $D_T$, and they extend between the intermediate zone 103 and the bottom edge 100c of the fiber structure blank in the longitudinal direction. The skin blanks 104 and 105 surround the spar portion blank 122 and the enlarged portion blank 112. The first and second skin blanks define first and second housings 130 and 131 inside the fiber structure blank 100, which housings are present on respective sides of the spar portion blank 122 in the transverse direction $D_T$.

Figure 5:
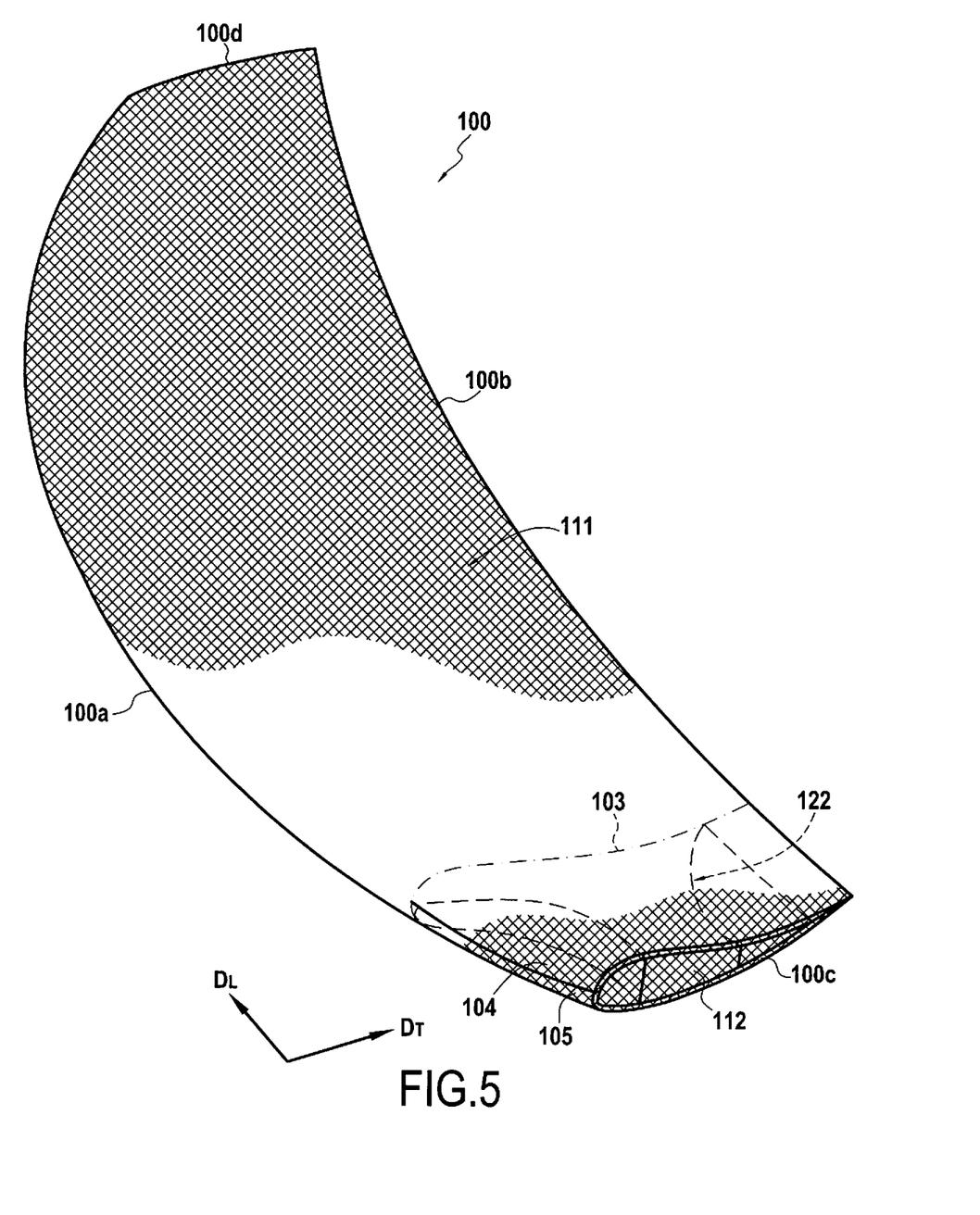
FIG. 5 is a diagrammatic perspective view of the fiber structure blank after cutting off the outer floated yarns.
Figure 6:
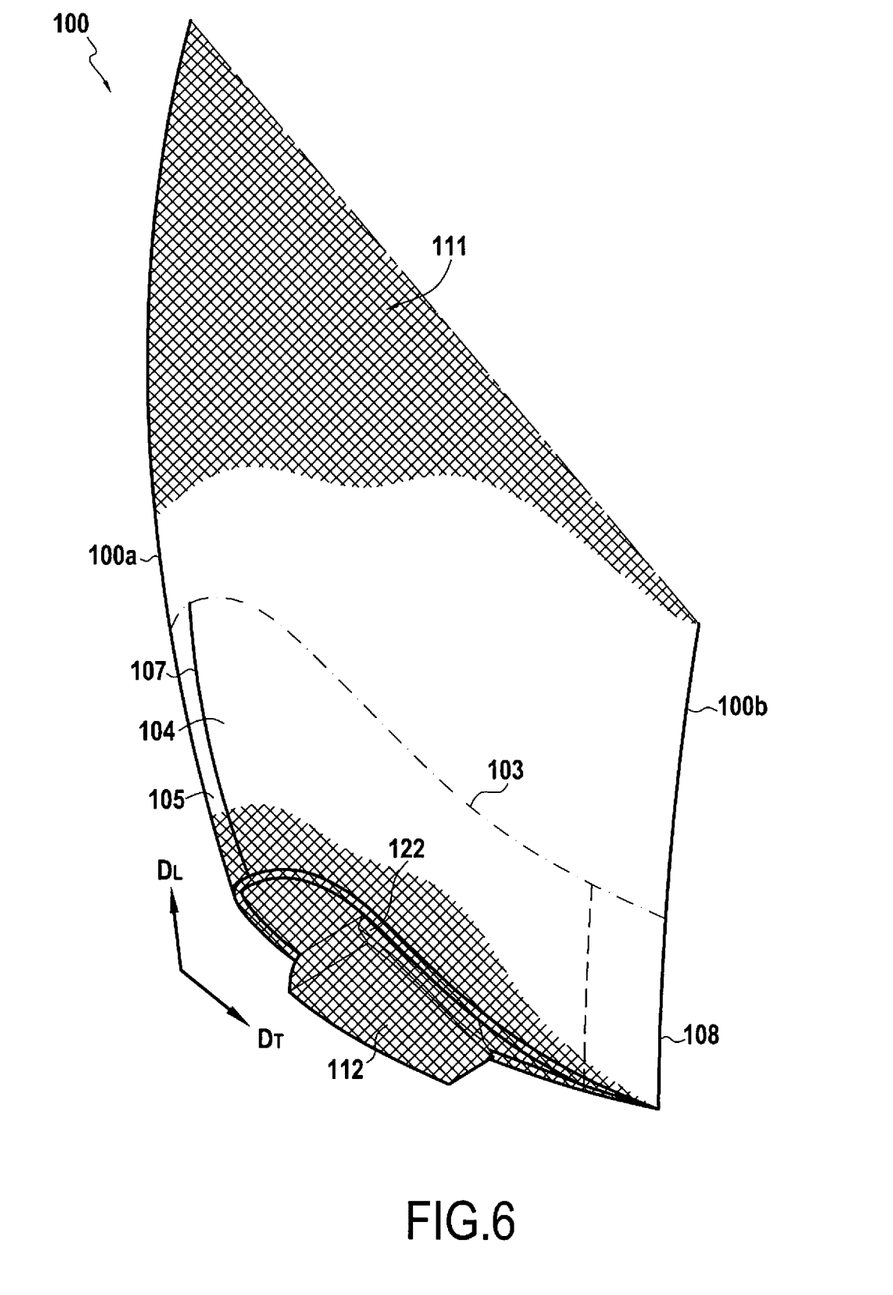
FIG. 6 is a diagrammatic perspective view of the fiber structure blank after cutting off the floated yarns present in the bottom portion of the blank.
Figure 7:
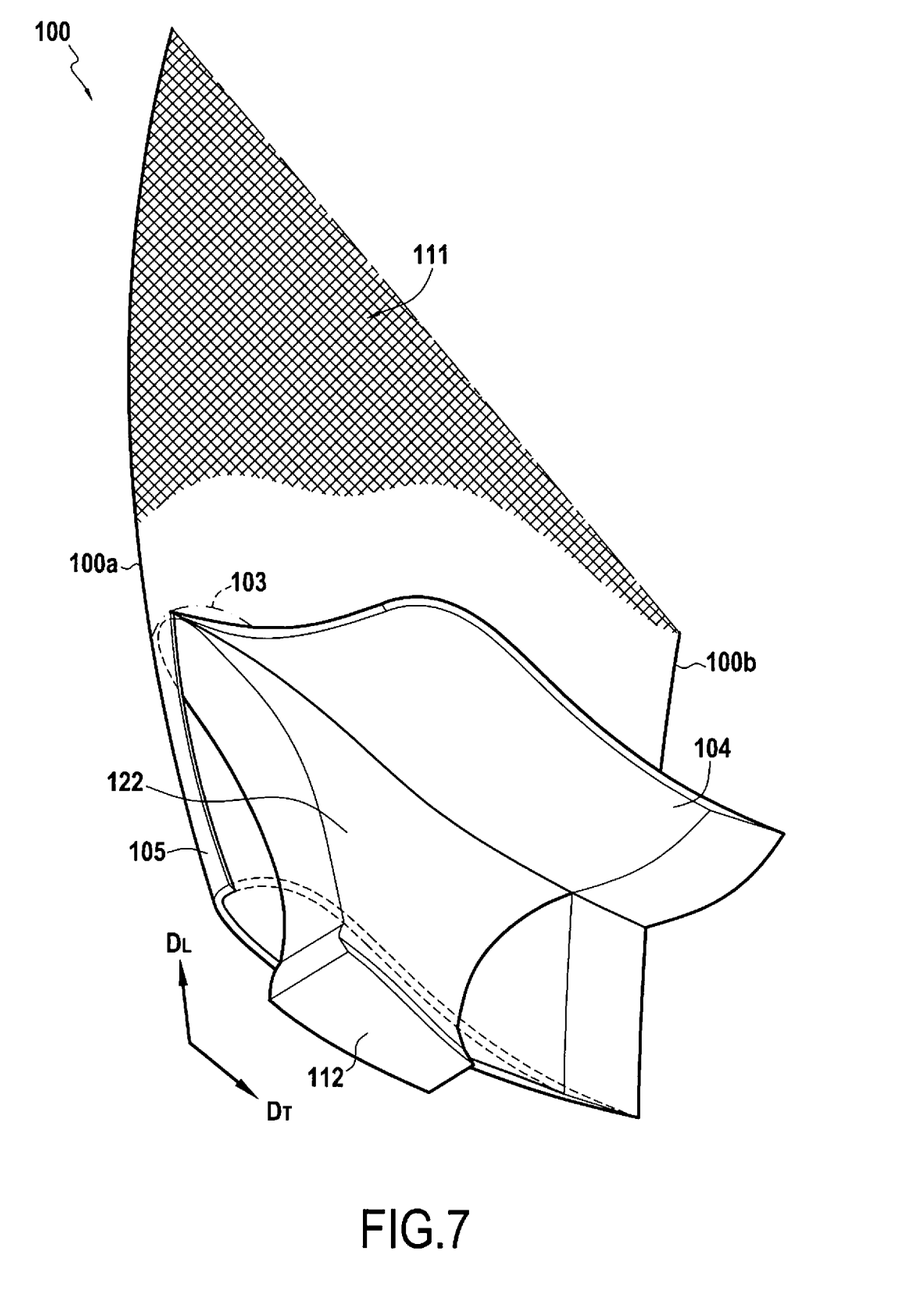
FIG. 7 is a diagrammatic perspective view of the fiber structure blank after cutting off the floated yarns present on the spar portion of the blank.

Once the fiber structure blank 100 has been woven, floated yarns present at the outside of the woven mass are cut off, e.g. by means of a water jet, so as to define the outline of the fiber structure as shown in FIG. 5. Floated yarns present on the skin blanks 104 and 105 in the bottom portion of the fiber structure blank are also cut off so as to disengage the enlarged portion blank 112 that is subsequently to form a blade root, and also so as to disengage a portion of the spar portion blank 122 that is subsequently to form a blade tang, as shown in FIG. 6. Floated yarns present around the spar portion blank 122 and the enlarged portion blank 112 are also cut off by lifting the skin blanks 104 and 105, as shown in FIG. 7. For this purpose, first and second slots 107 and 108 (FIG. 6) are formed between the skin blanks 104 and 105 respectively in the front edge 100a and in the rear edge 100b, the slots 107 and 108 extending in the longitudinal direction $D_L$. The slots 107 and 108 may be formed during weaving by not interlinking the front and rear edges, or by cutting after weaving.

In an embodiment, the skin blanks are of constant thickness. The decreasing thickness of the airfoil blank in the height direction is then generated at the spar portion blank. The yarn exits are therefore located under the skin blank, so it is desirable to be able to lift skin blanks in order to have access to the yarn exits.

Figure 8:
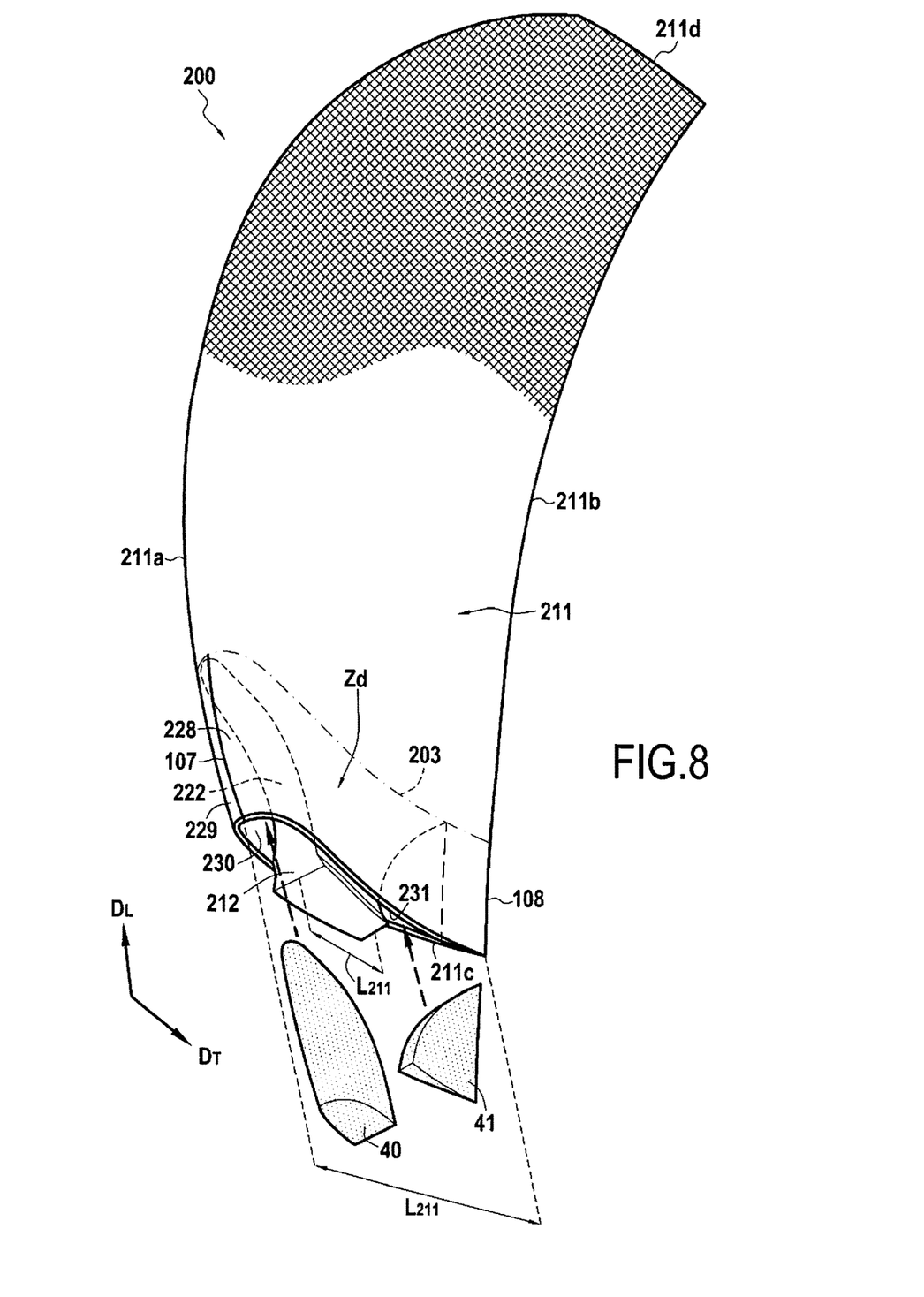
FIG. 8 is a diagrammatic perspective view of the fiber structure obtained together with the structure being shaped by using shaper parts.

As shown in FIG. 8, this obtains a fiber structure 200 that is woven as a single piece and that has an airfoil 211, a spar portion 222, and an enlarged portion 212, the airfoil 211 extending in the longitudinal direction $D_L$ between a bottom end 211c and a top end 211d, and extending in the transverse direction $D_T$ between a front edge 211a and a rear edge 211b. The fiber structure 200 has a zone $Z_d$ of non-interlinking that extends between the front and rear edges 211a and 211b of the airfoil 211 in the transverse direction $D_L$, and that extends between an intermediate portion 203 and the bottom edge 211c of the airfoil 211 in the longitudinal direction. The spar portion 222 extends inside the airfoil 211 in the zone $Z_d$ of non-interlinking, being set back from the front and rear edges 211a and 211b in the transverse direction $D_T$, and it extends in the longitudinal direction $D_L$ between an intermediate portion 203 situated between the bottom and top edges 211c and 211d of the airfoil 211 and the bottom edge 211c of said airfoil where the spar portion 222 projects from the airfoil. The enlarged portion 212 extends from the spar portion 222 outside the airfoil 211, the enlarged portion 212 extending in the transverse direction $D_T$ over a length $L_{212}$ that is less than the length $L_{211}$ of the bottom edge 211c of the airfoil. In the zone $Z_d$ of non-interlinking, the airfoil 211 has first and second skins 228 and 229 that are not interlinked, the first and second skins extending between the front and rear edges 211a and 211b of the airfoil in the transverse direction $D_T$, and extending between the intermediate portion 203 and the bottom edge 211c of the airfoil in the longitudinal direction $D_L$, the skins 228 and 229 surrounding the spar portion 222.

The first and second skins 228 and 229 define first and second housings 230 and 231 inside the airfoil, which housings are present on respective sides of the spar portion 222 in the transverse direction, the first and second housings 230 and 231 opening out in the bottom end of the airfoil 211.

In FIG. 8, the fiber structure 200 is shaped to form a blade preform by inserting shaper parts 40 and 41 into the housings 230 and 231 respectively.

Once the shaper parts 40 and 41 have been inserted into the housings 230 and 231, the blade fiber preform is densified. The slots 107 and 108 present in the front and rear edges 211a and 211b are, in an embodiment, reclosed by stitching prior to performing densification.

The fiber preform is densified by filling in the pores of the preform throughout all or part of its volume with the material that constitutes the matrix.

The matrix of the composite material may be obtained in conventional manner using a liquid technique.

The liquid technique consists in impregnating the preform with a liquid composition containing an organic precursor for the matrix material. The organic precursor is generally in the form of a polymer, such as a resin, and might possibly be diluted in a solvent. The preform is placed in a mold that can be closed in leaktight manner and that has a cavity with the shape of the final molded part, which in particular may present a shape that is twisted, corresponding to the final shape of the blade. Thereafter, the mold is closed and the matrix liquid precursor (e.g. a resin) is injected into the entire cavity in order to impregnate all of the fiber portion of the preform.

The precursor is transformed into the organic matrix, i.e. it is polymerized, by performing heat treatment, generally by heating the mold, after eliminating the solvent, if any, and curing the polymer, the preform continuing to be maintained in the mold of shape that corresponds to the shape of the blade. The organic matrix may be obtained in particular using epoxy resins, such as the high performance epoxy resin sold under the reference PR 520 (a curing epoxy resin system) by the supplier CYTEC ENGINEERED MATERIALS INC, or liquid precursors for carbon or ceramic matrices.

When forming a carbon or ceramic matrix, the heat treatment consists in pyrolyzing the organic precursor in order to transform the organic matrix into a carbon or ceramic matrix depending on the precursor that has been used and pyrolysis conditions. By way of example, liquid precursors for carbon may be resins having a relatively high coke content, such as phenolic resins, while liquid precursors for ceramic, in particular for SiC, may be resins of polycarbosilane (PCS) or polytitanocarbosilane (PTCS) or polysilazane (PSZ) type. It is possible to perform a plurality of consecutive cycles from impregnation to heat treatment in order to achieve the desired degree of densification.

In an aspect of the invention, the fiber preform may be densified by the well-known resin transfer molding (RTM) method. In the RTM method, the fiber preform is placed in a mold presenting the outside shape of the blade. A thermosetting resin is injected into the inside space of the mold that contains the fiber preform. A pressure gradient is generally set up in this inside space between the location where the resin is injected and discharge orifices for the resin so as to control and optimize impregnation of the preform by the resin.

By way of example, the resin used may be an epoxy resin. Resins suitable for RTM methods are well known. They desirably present low viscosity in order to facilitate injecting them between the fibers. The choice of temperature class and/or chemical nature for the resin depends on the thermomechanical stresses to which the part is to be subjected. Once the resin has been injected throughout the reinforcement, it is polymerized by heat treatment in compliance with the RTM method.

Figure 9:
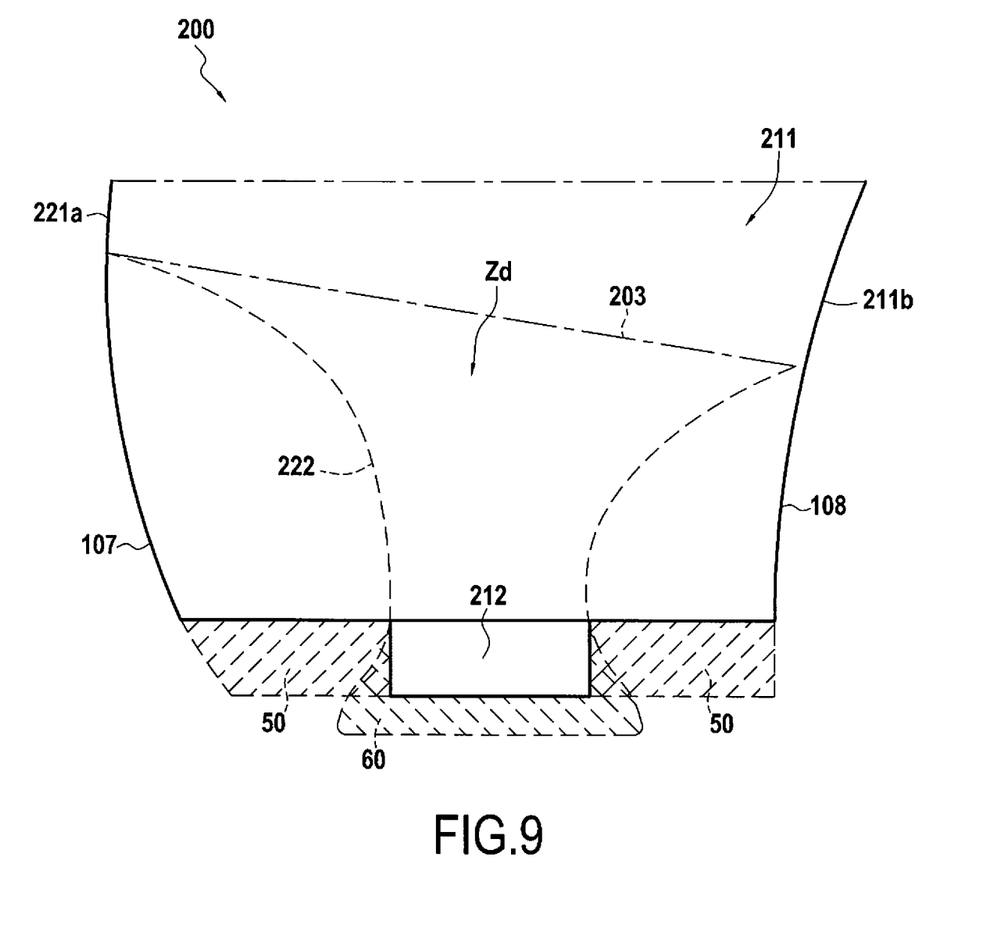
FIG. 9 is a diagrammatic perspective view of the blade preform densified with a matrix showing the final machining of the root, of the tang, and of the bottom portions of the skins.

After being injected and polymerized, the part is unmolded. As shown in FIG. 9, the excess lengths 50 present at the bottom portions of the skins and the extra lengths 60 present at the root and the tang are removed by machining. The machining is performed in such a manner as to avoid introducing connecting radii between the root and the tang. After machining, the enlarged portion forming the blade root 12 is connected to the spar portion via a tang 13 presenting side edges 13a and 13b that are straight and substantially parallel to the longitudinal direction $D_L$ (FIG. 1). This forms a shortened broached root without introducing any connection radii between the root and the airfoil, thereby greatly improving the mechanical strength of this portion of the blade. Specifically, the connection zone between the root and the airfoil is a zone where the blade is highly stressed mechanically since this is where the mechanical stresses generated by the shape of the moving blade are concentrated, corresponding to a zone where critical vibration can occur and lead to decohesion between the fibers and the matrix. When a connection radius is present between the airfoil and the root, it should be as large as possible, however that would imply increasing the size of the tang, which would then increase the overall weight of the propeller blade in undesirable manner. Furthermore, obtaining good control over the shape of the connection radius makes fabricating the propeller blade more complicated.

To finish, the part is trimmed in order to remove excess resin, and chamfers are machined. No other machining is necessary since the part is molded, so it complies with the required dimensions. A composite material blade 10 is thus obtained as shown in FIG. 1.

The cellular rigid material used for making the shaper parts 40 and 41 is, in an embodiment, a material having closed cells so as to avoid resin penetrating into the insides of the cells, thereby conserving the low density of the cellular material after the fiber preform has been densified.

The invention claimed is:

1. A fiber-reinforcing structure for a propeller blade made of composite material, the fiber-reinforcing structure having an airfoil, a spar portion, and an enlarged portion, the fiber-reinforcing structure being continuously woven as a single piece by three-dimensionally weaving a fiber structure blank to entirely form the airfoil, the spar portion and the enlarged portion, the airfoil extending in a longitudinal direction between a bottom edge and a top edge and extending in a transverse direction between a front edge and a rear edge, the fiber-reinforcing structure including a zone of non-interlinking between the front and rear edges of the airfoil in the transverse direction, and extending between an intermediate zone and the bottom edge of said airfoil in the longitudinal direction, the spar portion extending inside the airfoil in the zone of non-interlinking, being set back from the front and rear edges of said airfoil in the transverse direction, the spar portion leading to the outside of the airfoil in the bottom edge of said airfoil, the enlarged portion extending from the spar portion outside the airfoil, the enlarged portion extending in the transverse direction over a length that is shorter than the length of the bottom edge of the airfoil, the airfoil having first and second skins in the zone of non-interlinking that are not interlinked with each other, the first and second skins extending between the front and rear edges of the airfoil in the transverse direction, and extending between the intermediate zone and the bottom edge of said airfoil in the longitudinal direction, the first and second skins surrounding the spar portion, the first and second skins defining first and second housings inside the airfoil, wherein the first and second housings are present on respective sides of the spar portion in the transverse direction, the first and second housings opening out through the bottom edge of the airfoil, wherein an outline of the spar portion, of the bottom edge and of the enlarged portion is formed of yarns that are cut off in said three-dimensionally weaved fiber structure blank.

2. The fiber-reinforcing structure according to claim 1, wherein the front edge and the rear edge present respective slots extending in the longitudinal direction between the intermediate zone and the bottom edge of the fiber-reinforcing structure.

3. A propeller blade comprising fiber reinforcement constituted by a fiber-reinforcing structure according to claim 1 and densified by a matrix, the propeller blade comprising said airfoil, said spar portion extending inside the airfoil, a tang extending outside the airfoil, a root extending outside the airfoil from the tang, a first shaper part present in the first housing provided inside the airfoil, and a second shaper part present in the second housing provided inside the airfoil.

4. The propeller blade according to claim 3, wherein the tang connecting the root to the spar portion presents side edges that are straight and parallel to the longitudinal direction.

5. The propeller blade according to claim 3, wherein the height of the zone of non-interlinking present in the fiber-reinforcing structure constituting the fiber reinforcement of the propeller blade lies in the range 10% to 50% of the total height of the airfoil in the longitudinal direction.

6. An aeroengine including a plurality of propeller blades according to claim 3.

7. An aircraft including at least one aeroengine according to claim 6.

8. The fiber-reinforcing structure according to claim 1, wherein the intermediate zone defines an intermediate portion in the single piece from which both the spar and the first and second skins start extending, the intermediate portion being provided within the bottom half of the airfoil.

9. A method of fabricating a reinforcing-fiber structure for a propeller blade out of composite material, the method comprising:

three-dimensionally weaving a fiber structure blank as a single piece between a plurality of layers of weft yarns and a plurality of layers of warp yarns, the blank extending in a longitudinal direction between a bottom portion and a top portion and extending in a transverse direction between a front edge and a rear edge, the blank comprising an airfoil blank, a spar portion blank, and an enlarged portion blank, the method comprising, during weaving of the fiber structure blank, forming non-interlinking inside the airfoil blank, the non-interlinking extending between an intermediate zone and the bottom edge of the fiber structure blank in the longitudinal direction, and extending between the front and rear edges of the fiber structure blank in the transverse direction, the non-interlinking separating first and second portions present on either side of the spar portion blank so as to form first and second skin portion blanks that are not interlinked with each other, the first and second skin blanks extending between the front and rear edges of the fiber structure blank in the transverse direction, and extending between the intermediate zone and the bottom edge of the fiber structure blank in the longitudinal direction, the skin blanks surrounding the spar portion blank, the first and second skin blanks defining first and second housings inside the fiber structure blank, the housings being present on respective sides of the spar portion blank in the transverse direction, the first and second housings opening out through the bottom portion of the fiber structure blank, wherein the fiber-reinforcing structure is continuously woven as a single piece to entirely form the airfoil, the spar portion and the enlarged portion;

cutting off floated yarns present at the outside of the fiber structure blank so as to define the outline of the fiber-reinforcing structure; and cutting off floated yarns present around the spar portion blank and around the enlarged portion blank and also floated yarns present at the bottom portion of the fiber structure blank so as to obtain a fiber-reinforcing structure comprising an airfoil having a bottom edge from which an enlarged portion extends from a spar portion outside the airfoil, the enlarged portion extending in the transverse direction over a length shorter than the length of the bottom edge of the airfoil.

10. A method of fabricating a propeller blade out of composite material, the method comprising:

making a fiber-reinforcing structure in accordance with the method of claim 9;

shaping the fiber-reinforcing structure by inserting first and second shaper parts respectively into the first and second housings present inside the airfoil of the fiber-reinforcing structure in order to obtain a propeller blade preform;

densifying the preform with a matrix; and machining away excess lengths present on the densified preform in order to obtain a propeller blade having said airfoil, said spar portion extending inside the airfoil, a tang extending outside the airfoil, a root extending outside the airfoil from the tang, said first shaper part present in the first housing formed inside the airfoil, and said second shaper part present in the second housing formed inside the airfoil.

11. The method of fabricating a propeller blade out of composite material according to claim 10, for fabricating a propeller blade out of composite material, wherein the tang connecting the root to the spar portion presents side edges that are straight and parallel to the longitudinal direction.

12. The method of fabricating a propeller blade out of composite material according to claim 10, for fabricating a propeller blade, wherein the height of the zone of non-interlinking present in the fiber-reinforcing structure constituting the fiber reinforcement of the propeller blade lies in the range 10% to 50% of the total height of the airfoil in the longitudinal direction.

* * * * *